United States Patent
Carlson

(10) Patent No.: US 9,725,095 B2
(45) Date of Patent: Aug. 8, 2017

(54) ADAPTIVE AUTOMATIC TRANSMISSION CONTROL SYSTEM

(71) Applicant: International Truck Intellectual Property Company, LLC, Lisle, IL (US)

(72) Inventor: Bradley S. Carlson, Naperville, IL (US)

(73) Assignee: International Truck Intellectual Property Company, LLC, Lisle, IL (US)

(*) Notice: Subject to any disclaimer, the term of this patent is extended or adjusted under 35 U.S.C. 154(b) by 46 days.

(21) Appl. No.: 14/891,193

(22) PCT Filed: May 29, 2013

(86) PCT No.: PCT/US2013/043135
§ 371 (c)(1),
(2) Date: Nov. 13, 2015

(87) PCT Pub. No.: WO2014/193367
PCT Pub. Date: Dec. 4, 2014

(65) Prior Publication Data
US 2016/0107648 A1    Apr. 21, 2016

(51) Int. Cl.
*B60W 10/06* (2006.01)
*B60W 30/182* (2012.01)
(Continued)

(52) U.S. Cl.
CPC .......... *B60W 30/182* (2013.01); *B60W 10/06* (2013.01); *B60W 10/10* (2013.01);
(Continued)

(58) Field of Classification Search
CPC .... F16H 61/4008; F16H 59/54; Y10T 477/68; Y10T 477/648; B60W 30/1852;
(Continued)

(56) References Cited

U.S. PATENT DOCUMENTS 3,876,033 A    4/1975    Shore
5,454,442 A    10/1995   Labuhn et al.
(Continued)

FOREIGN PATENT DOCUMENTS

JP    EP 1336526 A2 *    8/2003    ......... B60K 31/0008

OTHER PUBLICATIONS

PCT Search Report from corresponding parent application, PCT/US2013/043135.

*Primary Examiner* — Roger Pang
(74) *Attorney, Agent, or Firm* — Jeffrey P. Calfa; Mark C. Bach

(57) ABSTRACT

An adaptive automatic transmission control system responds to stopping of a vehicle for reducing torque absorption by an automatic transmission and movement of and range to obstructions forward from a vehicle for reengaging the automatic transmission after a stop. The torque converter is released from its reduced torque absorption mode under one of three circumstances: 1) the brake pedal is released; 2) the detected obstruction moves outside a first predefined maximum range; and, 3) the detected obstruction moves outside a second predefined maximum range and at greater than a predefined minimum speed.

12 Claims, 4 Drawing Sheets

(51) Int. Cl.
*F16H 61/02* (2006.01)
*F16H 59/54* (2006.01)
*B60W 10/10* (2012.01)
*F16H 61/4008* (2010.01)
*F16H 61/4183* (2010.01)
*B60W 30/16* (2012.01)
*F16H 59/70* (2006.01)

(52) U.S. Cl.
CPC ......... *F16H 59/54* (2013.01); *F16H 61/0213* (2013.01); *F16H 61/4008* (2013.01); *F16H 61/4183* (2013.01); *B60W 30/16* (2013.01); *B60W 2510/1005* (2013.01); *B60W 2510/18* (2013.01); *B60W 2520/10* (2013.01); *B60W 2540/12* (2013.01); *B60W 2540/16* (2013.01); *B60W 2550/10* (2013.01); *B60W 2710/1088* (2013.01); *F16H 59/70* (2013.01); *F16H 2061/0234* (2013.01); *Y10T 477/648* (2015.01); *Y10T 477/68* (2015.01)

(58) Field of Classification Search
CPC .. B60W 10/06; B60W 10/10; B60W 2540/16; B60W 2710/1088; B60W 2510/1005; B60W 2550/10; B60W 2510/18; B60W 2520/10; B60W 30/16; B60W 2540/12
See application file for complete search history.

(56) References Cited

U.S. PATENT DOCUMENTS

| | | | |
|---|---|---|---|
| 6,398,692 | B1 | 6/2002 | Isaac |
| 6,416,021 | B2 | 7/2002 | Greene, Jr. |
| 6,622,810 | B2 | 9/2003 | Labuhn et al. |
| 7,457,699 | B2 | 11/2008 | Chia |
| 7,878,943 | B2 | 2/2011 | Ehret et al. |
| 2002/0044047 | A1* | 4/2002 | Miyakoshi ......... B60K 31/0008 340/435 |
| 2007/0215401 | A1* | 9/2007 | Braeuchle .......... B60K 31/0008 180/170 |
| 2007/0219695 | A1* | 9/2007 | Chiu .................... B60W 30/08 701/51 |
| 2012/0065863 | A1* | 3/2012 | Takagi ................. B60K 31/047 701/96 |
| 2013/0282252 | A1* | 10/2013 | Takagi ...................... B60T 7/22 701/70 |
| 2016/0201633 | A1* | 7/2016 | Quinteros ............ F02N 11/084 477/111 |
| 2017/0021825 | A1* | 1/2017 | Burt ...................... B60W 20/30 |

* cited by examiner

ADAPTIVE AUTOMATIC TRANSMISSION CONTROL SYSTEM

BACKGROUND

Technical Field

The present subject matter relates generally to the control of hydraulic automatic transmissions for motor vehicles and, more particularly, to control over transmission operational modes based on the velocity or proximity of obstructions to the motor vehicles.

Description of the Technical Field

Some hydraulic automatic transmissions provide for reducing the parasitic load imposed on vehicle engines during periods when the vehicles are stopped. Examples of such a transmissions include examples supplied by Allison Transmission of Indianapolis, Ind. such as the 3000 HS, 4000 HS and 4500 HS automatic transmissions. These transmissions operate at reduced pressure upon braking the vehicle to a complete stop even while the transmission remains "in gear." This operational mode reduces the load on the engine and the amount of fuel used to maintain a minimum idle speed. Allison calls this mode of transmission operation "reduced engine load at stop" (RELS).

In the Allison transmissions return to the normal operating mode from RELS mode occurs upon indication of brake release. On vehicles equipped with pneumatic brakes such indication is a change in brake system air pressure. This results in a lag between brake release and the transmission's return to normal operating pressure. Operators may notice hesitation or initially sluggish acceleration on the part of a vehicle after a stop.

SUMMARY

A control system for a vehicle power train having an automatic transmission with a plurality of forward gears and providing for a reduced torque absorption mode of operation of the transmission while in gear further provides for adaptive release from the reduced torque absorption mode based on the location and movement of obstructions proximate to the vehicle. The control system includes a system for detecting obstructions forward from the vehicle. Such an obstruction detection system is commonly provided with an adaptive cruise control system. The obstruction detection system is typically a radar or laser reflector based system and is directed forward from the base vehicle. The obstruction detection system provides the range to an obstruction and the forward vector velocity of the obstruction. As long as the current gear selected/requested remains a forward gear, the transmission is returned to a normal operating mode from a reduced torque absorption mode with the first to occur of three circumstances: 1) the brake pedal is released (or indirect indication of such release is detected); 2) the obstruction moves outside a first predefined maximum range; or, 3) the obstruction is outside a second predefined maximum range within the first predefined maximum range and has a forward vector velocity exceeding a predefined minimum. The control system may provide entry to reduced torque absorption mode when the obstruction detection system and vehicle operating conditions indicate an operator is allowing the motor vehicle to coast to a stop.

DETAILED DESCRIPTION

Figure 1:
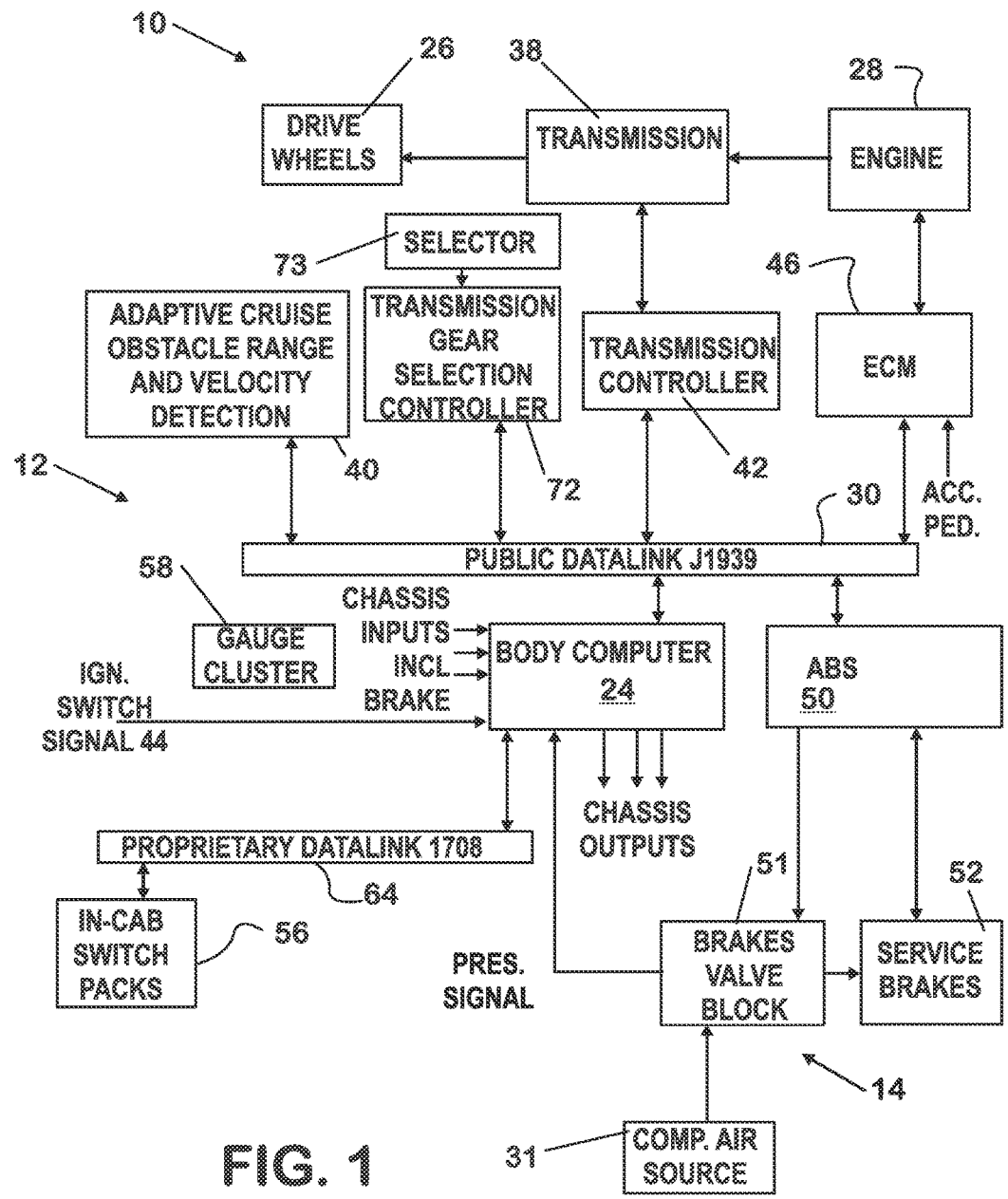
FIG. 1 is a block diagram schematic of a motor vehicle power-train and related control system.

In the following detailed description, like reference numerals and characters may be used to designate identical, corresponding, or similar components in differing drawing figures.

Referring now to the figures and in particular to FIG. 1, a vehicle power train 10 and related vehicle control system 12 are illustrated. The power train 10 includes at least a first prime mover, here embodied in an internal combustion (IC) engine 28, vehicle drive wheels 26 and a hydraulic automatic transmission 38 which transmits torque from the IC engine to the drive wheels. The control system 12 includes a controller area network (CAN) which conforms to the Society of Automotive Engineers (SAE) J1939 standard. The backbone of the CAN is a public datalink 30 which connects a plurality of nodes. The nodes generally correspond to several controllers some of which exercise control over power train 10 components. Elements of a pneumatic brake system 14 are also illustrated including service brakes 52, a compressed air source 31 and a valve block 51 for controlling application and release of compressed air relative to the service brakes 52. An anti-lock brake system (ABS) controller 50 controls application of compressed air through the brakes valve block 51 to the service brakes 52 and monitors wheel rotational speed.

CAN data messages generated by nodes/controllers and broadcast over the datalink 30 are usually characterized by type and identified as to a source node, but are not addressed to any particular node. The messages include data relating to vehicle operation and conditions and requests relating to operation of certain vehicle components. The nodes are programmed to recognize certain messages as being applicable to the particular node and to execute operations in response to requests occurring in messages within the context of the current vehicle condition (as determined from other messages). By way of example, a message may be generated by a transmission gear selection controller 72 requesting moving the transmission 38 into reverse. The transmission controller 42 will recognize the request (a current gear selected/requested message) as relating to it but will carry out the request only if and when vehicle conditions allow for it. Where the current gear achieved is a forward gear and vehicle speed is positive the transmission controller 42 may hold the request in abeyance because interlocks relating to the request have not been satisfied.

The illustration of control system 12 is not complete but includes nodes/controllers relating to transmission operation and some other representative controllers. The controllers which have an operational relationship to transmission 38 in the context of the present disclosure include: the engine control module (ECM) 46; the transmission controller 42; a transmission gear selection controller 72; an anti-lock brake system (ABS) controller 50; and an adaptive cruise forward obstruction range and velocity detection system (ACORVD) 40. Also shown for completeness are a gauge cluster controller 58 and a body computer 24. The body computer 24 is a possible, but not exclusive, source of vehicle operational data relevant to the operations described here.

Part of the context in which power train 10 operates are current operator/driver inputs into or monitored by the control system 12. Responses by controllers are subject to the vehicle situation as established by these inputs and the current conditions of vehicle operations established by sensors. Operator inputs to control system 12 occur primarily, but not exclusively, through the agency of the body computer 24. Body computer 24 is connected to receive a number of chassis inputs which include brake pedal position and ignition switch 44 position. Some operator inputs to body computer 24 are entered through a switch pack 56 and transmitted to the body computer using over a low speed datalink 64. This data may include selection of a cruise speed to be maintained by the vehicle. Brake pedal position may be indicated by a position sensor input to the body computer 24. Release of the service brakes 52 is monitored by measuring changes in pneumatic brake system 14 air pressure. Accelerator position is received directly by ECM 46. Operator selection of gears is through a gear selector lever 73 with the selections passed to the control system 12 through the transmission gear selection controller 72.

Vehicle context relevant to adaptive transmission operational control also includes vehicle speed, which may be calculated and reported over datalink 30 by an anti-lock brake system (ABS) controller 50. Alternatively, the engine control module (EMS) 46 may use output shaft speed reported by the transmission controller 42 combined with data for the rear (or drive) axle ratio and tire size to determine vehicle speed based on rotational speed of the drive wheels 26. In either case the transmission controller 42 can then read vehicle speed from the datalink 30.

The transmission gear selection controller 72 generates a gear selected/requested message which is broadcast over the datalink 30. The "gear selected" is not necessarily the same gear as the current engaged gear or "gear achieved." The transmission controller 42 does not act on the gear selected message to place the transmission 38 in the selected gear until all interlocks for such placement have been satisfied. To take an extreme example, an operator may move the selector to "Reverse" while the vehicle transmission 38 is in a forward gear and the vehicle is moving at highway speeds. In this case the transmission controller 42 will ignore the gear selected message until the vehicle comes to a stop (possibly including application of the brake). Only then will the transmission controller 42 act on the gear selected/requested message (provided any other interlocks are met) and only then can the current gear selected match the current gear achieved. The current gear achieved is broadcast over the datalink 30 by the transmission controller 42. When the current gear selected is different than the current gear achieved the gear selector 73 or gauge cluster 58 may be used to indicate such, usually by flashing of an indicator lamp. This may be done where the current gear selected is, for example, reverse while the current gear achieved is a forward gear. It is unlikely to be done where the current gear selected is a forward drive gear and the current gear achieved is a forward low gear.

ECM 46 control over IC engine 28 can occur in response to requests embodied in CAN messages sourced by the body computer 24. Messages from the transmission controller 42 may affect the character of the ECM 46 response. Messages from the body computer 24 can request a given level of torque output or they may request that the IC engine 28 be run at idle. Operation at idle entails maintaining a predetermined minimum engine 28 operating speed. Reducing the load on engine 28 reduces fuel consumption by engine 28, even at idle.

In vehicles programmed to implement a RELS mode, or any similar reduced torque absorption mode, on transmission 38, the transmission controller 42 can operate to reduce transmission 38 operating pressure when the vehicle stops, during braking or during coast down. The reduced pressure results in reduced transmission 38 load on the IC engine 28 results in reduced fuel consumption to maintain engine 28 operation at idle speed.

For Allison transmissions, a transmission 38 is placed in RELS mode (or its equivalent for other manufacturers) responsive to the vehicle on which power train 10 is installed coming to a complete stop with the brake pedal depressed. Thus, before the power train 10 enters into the RELS mode three conditions are satisfied: 1) current gear achieved is a forward drive gear; 2) the brake pedal is depressed; and 3) vehicle speed is zero (usually satisfied by a speed measurement signal on datalink 30 of less than a low threshold speed, for example <3 kph.) Upon satisfaction of these conditions the vehicle transmission 38 torque converter is placed in RELS mode in which torque absorption is reduced. The transmission 38 is returned to a normal forward operating mode (operating pressure is increased allowing greater torque absorption) upon release of the brake pedal so long as the current gear requested remains a forward gear. Detection of release of the brake pedal for purposes of release from RELS occurs through measuring changes in air pressure in the pneumatic brake system 14. The current gear achieved may not correspond to the current gear selected (unless the current gear selected is "Low") but progress through a sequence of gears until the current gear selected is reached.

Control system 12 is equipped and programmed to implement an autonomous/adaptive cruise control system in which an operator may select a speed to maintain but where the vehicle, using radar or laser range finding, adapts its speed to the speed of objects in the path of the vehicle where the obstructing vehicle is moving more slowly than the cruise speed selected. In order to implement autonomous cruise control the adaptive cruise forward obstruction range and velocity detection system 40 generates messages relating to detection of an obstruction directly in front of the vehicle on which power train 10 is installed, the distance to this forward obstruction and the forward obstruction's forward vector velocity. As used here the term autonomous means that a system does not use external data sources, the measurements used are generated exclusively from on board sensors. The forward vector velocity is the velocity component away from the base vehicle aligned on the longitudinal axis of the base vehicle. A negative forward vector velocity means that the forward obstruction is moving in the direction of the base vehicle in an external frame of reference.

Distance and velocity measurements for a forward obstruction can be supplied from alternatives to an ACORVD 40. For example, both rear and forward autonomous collision avoidance systems may supply equivalent data. It is also possible that such data can be supplied in a non-autonomous situation. Such would be the case where a forward obstructing vehicle and the base vehicle equipped with power train 10 and control system 12 were communicating operational data to one another.

Figure 2:
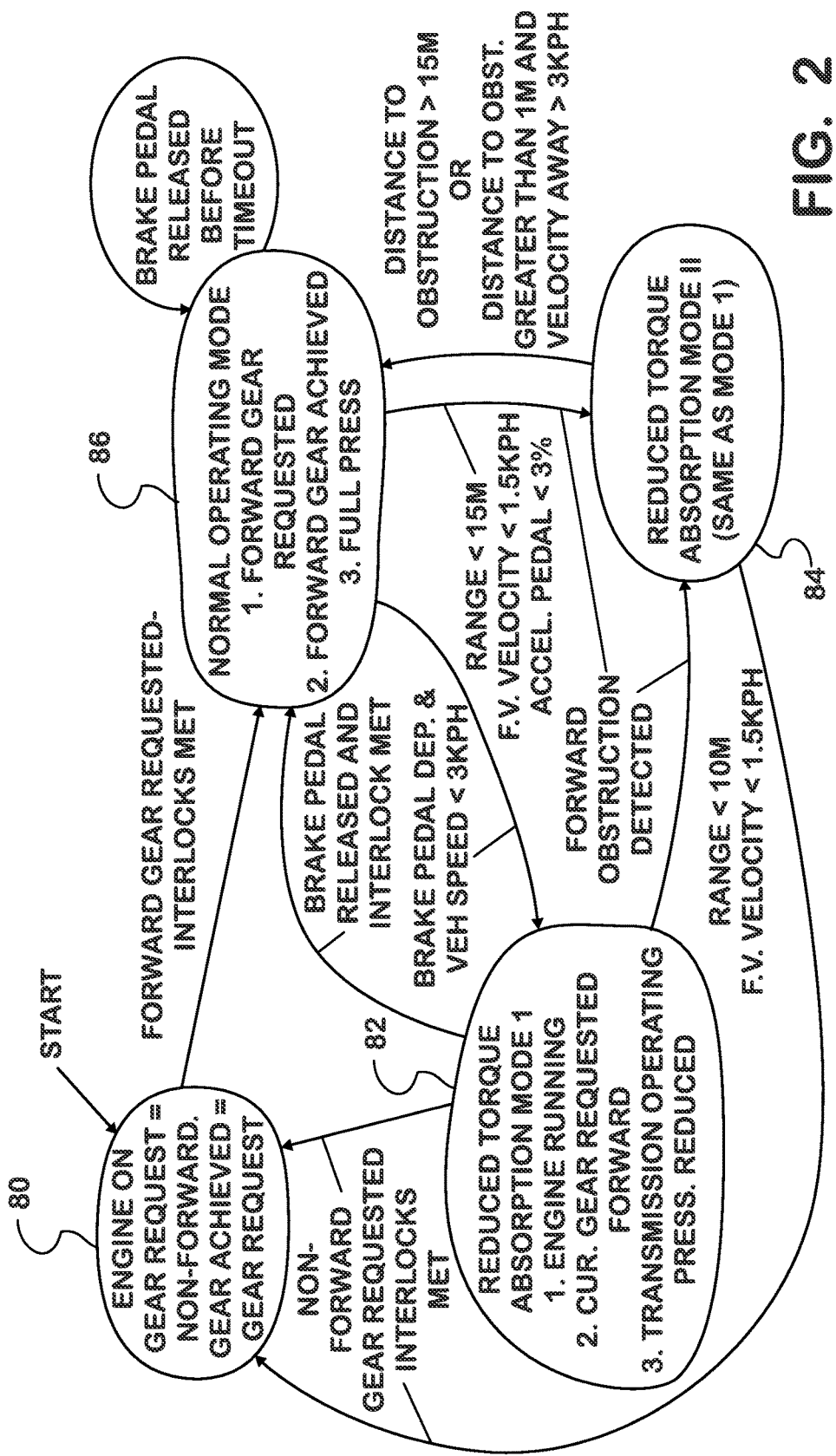
FIG. 2 is a state transition diagram.

Referring to FIG. 2, a state machine for automatic transmission 38 illustrates its operation so as to reduce the frequency of occurrence of lagging release of the transmission from a reduced torque absorption or RELS like operational mode. It is assumed that the vehicle on which the present system is installed permits starting of the vehicle IC engine 28 only with the vehicle transmission 38 in park or neutral (both current requested gear and current gear achieved). Accordingly, upon start, the transmission 38 is in a state where park or neutral is both the current gear requested and the current gear achieved and the engine is on. For the sake of simplicity of illustrating the present system, the state of the transmission 38 being in a reverse gear (both requested and achieved) is merged with the park/neutral states as a non-forward gear state 80.

Any transition out of state 80, that is from Park, Neutral, or Reverse, to a forward gear entails operator selection/request of a forward gear. Before the state change is executed other interlocks may have to be met as well. For example a shift from a reverse gear to a forward gear may include interlocks providing that the brake pedal be depressed and vehicle speed be zero. The interlocks for shifts from other non-forward gear settings may differ. For example, a shift from coasting in neutral to a forward gear may be permitted without depression of the brake pedal to allow coasting with the vehicle.

From state/mode 80, selection of forward gear under conditions where the interlocks are met for leaving the current gear achieved results in transition to state/mode 86. State 86 is termed a normal forward operating mode. The depiction is simplified as it may be permissible to allow transition from the normal forward operating mode 86 to neutral as a current gear achieved while the vehicle is in motion and depression of the brake pedal is released. Such an operational mode and others are not directly relevant to the present disclosure and are not shown.

In the normal forward operating mode 86 the current gear requested is a forward gear and the current gear achieved is a forward gear. These are not necessarily the same forward gears. For example, if the current gear requested were a low gear and vehicle speed were high, meeting the request might involve over revving of the IC engine 28.

Exit from normal forward operating mode 86 occurs to a reduced transmission torque absorption mode I (state 82). This occurs upon depression of the brake pedal and vehicle speed falling to 0 (or more usually, indicated vehicle speed decreasing below 3 kph or some other low threshold). If the normal forward operating mode (state 86) was entered with the brake pedal depressed and the brake pedal is not soon thereafter released, a transition to state 82 occurs after expiration of a short timeout, assuming the other interlock conditions are met. RELS mode is to be considered one example of a reduced torque absorption mode. That is: 1) the engine is running; 2) the current gear requested is a forward gear; and 3) the transmission operating pressure is somehow reduced. Release from state 82 back to the normal forward operating mode 86 occurs upon release of the brake pedal and meeting other interlocks, if any.

An additional mode is provided for handling forward obstructions. This is termed reduced torque absorption mode II (state 84). The mode is identical to reduced torque absorption mode I except that entry to the mode occurs only upon detection of a forward obstruction and release from the mode occurs as a result of movement of a detected obstruction out of range or upon the obstruction achieving a minimum positive forward vector velocity (at a second, much smaller range). A forward obstruction is defined as occurring when the transmission 38 is in normal operating mode (state 86) when the ACORVD 40 reports an obstruction within 15 meters distance directly in front of the vehicle which has a forward vector velocity of less than 1.5 kph. Other distances and forward vector velocities can be defined and the definitions need not have anything to do with response of the adaptive cruise control system.

Figure 3:
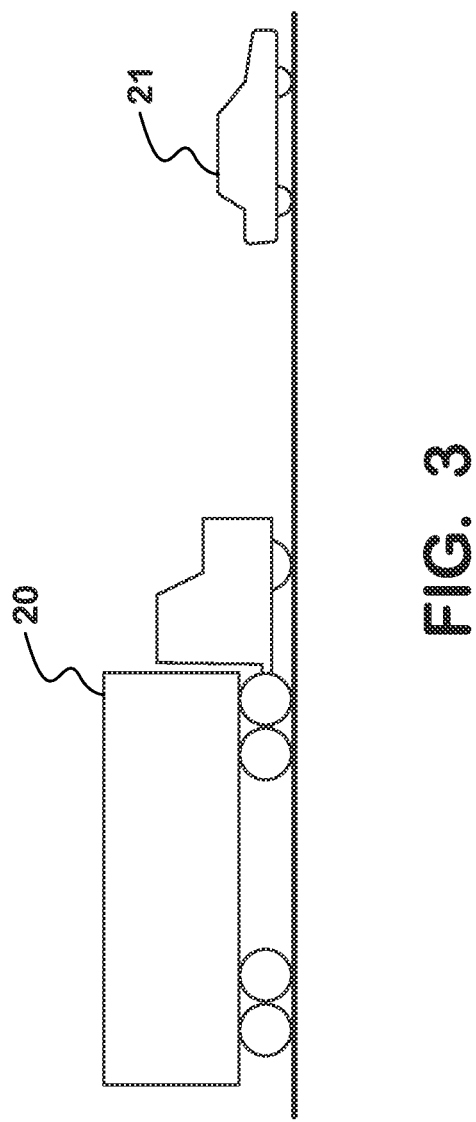
FIG. 3 is a side view of an automobile located in front of a truck equipped with an adaptive transmission control system.

Detection of a forward obstruction occurring while the vehicle is in normal operating mode 86 in which case reduced torque absorption mode II (state 84) is entered directly from normal operating mode I (state 86) upon distance to an obstruction being, for example, less than 15 meters, forward vector velocity of the obstruction being less than 1.5 kph and the vehicle accelerator pedal being less than 3% depressed. The circumstances under which this condition can occur vary, but should be most common when a vehicle on which the present system is installed coasts up behind a stopped vehicle as illustrated in FIG. 3. Under these circumstances, under conditions where the operator does not request a non-forward gear, the system "assumes" that forward motion of the base vehicle, here a truck 20, will be resumed when the forward obstructing vehicle, here an automobile 21, begins to move. With the automatic transmission 38 in reduced torque absorption mode II (state 84) an increase in distance to the forward obstruction to greater than 15 meters, or with the distance to the forward vehicle opening to one meter and its forward vector velocity increasing to over 3 kph, the transmission 38 state translates from reduced engine load operating mode II (state 84) to normal forward operating mode (state 86). In other words, transmission 38 hydraulic pressure is increased without release of the brake pedal. This eliminates occasions of lag experienced by the operator where the only trigger for releasing the transmission 38 from reduced torque absorption mode is detection of release of the brake pedal and permits entry to the reduced torque absorption mode under circumstances where the brake pedal is not actually depressed.

After exiting reduced torque absorption mode II (state 84) the normal operating mode (state 86) may be reached with the brake pedal still depressed (if state 84 was reached from state 82). The transmission 38 remains in the state only if the brake pedal was not depressed or is released before a time out threshold is reached. Otherwise the transmission state returns to reduced torque absorption mode I (state 82).

Figure 4:
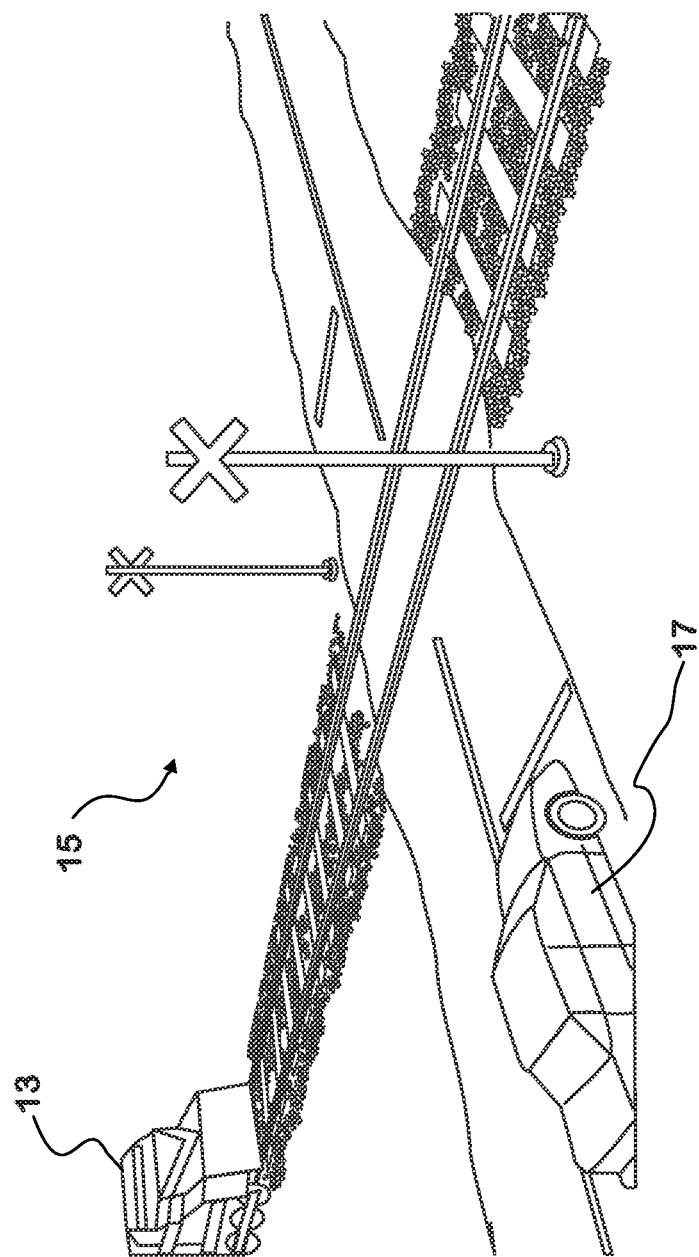
FIG. 4 is a perspective view of a vehicle which may be equipped with an adaptive transmission control system stopped short of a railway level grade crossing.

The state machine of FIG. 2 may optionally be configured to allow for state transitions from reduced engine load operating mode I (state 82) to reduced engine load operating mode II (state 84). Circumstances where this transition would occur, if allowed, could relate to forward obstructions including approaching vehicles and other transient obstructions. For example, translation from state 86 through state 82 to state 84 could occur when approaching another stopped or slow moving vehicle with the brake pedal depressed. As illustrated in FIG. 4, a vehicle 17 could come to a stop at a railway level grade crossing 15 for an oncoming locomotive 13. No obstruction would be present at first, but entry of the locomotive 13 into the level grade crossing 15 would trigger detection of a forward obstruction relative to the vehicle. The path forward would be blocked by an object within a predefined distance having a low forward vector velocity away from the vehicle. Such a low forward vector velocity can occur even if the train travels at high speed in a direction perpendicular to the base vehicle's longitudinal orientation. The ranges and forward vector velocities measured for qualification of a forward obstruction for a transition from state 82 to state 84 are not necessarily the same as those used to qualify a forward obstruction prior to a transition from state 86 to state 84. Movement of the locomotive 13 (and any train towed by the locomotive) past the level grade crossing 15 results in either loss of detection of an obstruction or the range to an obstruction becoming (effectively) infinite.

Changes in state from both reduced torque absorption mode I (state 82) and reduced torque absorption mode II (state 84) back to non-forward gear mode (state 80) are allowed. These occur when the operator operates the gear select 73 to select a non-forward gear. If any interlocks are provided by programming they must also be satisfied before the transition is allowed.

The use of sensed external events to repressurize an automatic transmission can be applied to auto start stop engine controls which have relied on brake release or, on vehicles with a manual transmission, depression of the clutch, as triggers for starting an engine after a stop.

What is claimed is:

1. A power train and associated control system for a vehicle, the power train and associated control system comprising:
    an engine;
    a transmission including a torque converter, the transmission having a plurality of forward gears and a plurality of non-forward settings with the transmission being connected to the engine to absorb torque generated by the engine;
    a brake system including an operator brake pedal for application of the brake system;
    means for measuring vehicle speed;
    means for detecting obstructions forward from the vehicle;
    the means for detecting obstructions providing ranges to a detected obstruction and its forward vector velocity;
    a transmission gear selector for generating a current gear requested;
    a transmission controller responsive to the current gear requested and gear specific interlock conditions for setting a current gear achieved and further responsive to selected vehicle conditions and the current gear achieved being a forward gear for placing the transmission in a reduced torque absorption operating mode from a normal operating mode;
    the transmission controller being responsive to release of application of the brake system for placing the transmission in the normal operating mode from the reduced torque absorption mode; and
    the transmission controller being responsive to movement of a detected obstruction away from the vehicle or a change in location of a detected obstruction for placing the transmission in the normal operating mode from the reduced torque absorption mode.

2. The power train and associated control system of claim 1, further comprising:
    the transmission controller being further responsive to movement of a detected obstruction through a predefined range and having a forward vector velocity exceeding a predefined minimum for placing the transmission in the normal operating mode from the reduced torque absorption mode.

3. The power train and associated control system of claim 1, further comprising:
    the transmission controller being further responsive to moving outside a predefined range for placing the transmission in the normal operating mode from the reduced torque absorption mode.

4. An adaptive transmission control system for an automatic transmission installed on a vehicle, the adaptive control system comprising:
    means for detecting obstructions forward from the vehicle, the means for detecting obstructions including means for determining ranges to the obstruction and means for determining a forward vector velocity of the obstruction;
    a source for a current gear selection;
    a vehicle brake system;
    means responsive to stopping the vehicle using the vehicle brake system for putting the automatic transmission into a reduced torque absorption mode;
    means responsive to release of the vehicle brake system with the automatic transmission in the reduced torque absorption mode for returning the automatic transmission to a normal operating mode;
    means responsive to movement of a detected obstruction outside a predefined range at greater than a predefined minimum velocity away from the vehicle for returning the automatic transmission to the normal operating mode from the reduced torque absorption mode; and
    the means responsive to movement of a detected obstruction being further responsive to relocation of the detected obstruction outside a predefined maximum range for returning the automatic transmission to the normal operating mode from the reduced torque absorption mode.

5. The adaptive transmission control system of claim 4, further comprising:
    the means for detecting obstructions being a range finding system shared with an adaptive cruise control system for the vehicle.

6. A method for operating an automatic transmission on a vehicle, the vehicle including an engine; the automatic transmission where the automatic transmission has a plurality of forward gears and non-forward gears, the transmission being connected to the engine to absorb torque generated by the engine, a brake system including an operator brake pedal, and a driver operated transmission gear selector, the method comprising the steps of:
    providing a plurality of transmission interlocks for operation of the transmission in the forward gears;
    responsive to the driver operated transmission gear selector, determining a current gear selected;
    responsive to the current gear selected being a forward gear and the interlocks for any forward gear being met, making one of the plurality of forward gears a current gear achieved;
    measuring vehicle speed;
    detecting an obstruction forward from the vehicle including range to the obstruction and velocity of the obstruction away from the vehicle;
    responsive to stopping the vehicle using the brake system while the current gear requested is a forward gear and the current gear achieved is a forward gear, placing the automatic transmission in a reduced engine load operating mode; and
    responsive to one of a plurality of triggering events, terminating the reduced engine load operating mode.

7. The method of claim 6, wherein the reduced engine load operating mode includes reducing automatic transmission operating pressure.

8. The method of claim 6, wherein the reduced engine load operating mode includes shut down of the engine.

9. The method of claim 7, further comprising the step of:
    terminating the reduced engine load operating responsive to release of the brake pedal.

10. The method of claim 7, further comprising the step of:
    terminating the reduced engine load operating mode responsive to range to a detected obstruction exceeding a predefined maximum distance.

11. The method of claim 7, further comprising the step of:
    terminating the reduced engine load operating mode responsive to range to a detected obstruction exceeding a predefined distance concurrent with a the detected obstruction exceeding a predefined minimum speed in a prescribed direction.

12. The method of claim 7, further comprising the step of: placing the transmission in a reduced engine load operating mode responsive to detection and approach to an obstruction where the obstruction is within a defined range and forward vector velocity of the obstruction is less than a predefined maximum.

\* \* \* \* \*